Aug. 30, 1932.  G. K. McCANN  1,875,079
BRAKE
Filed Feb. 16, 1928   2 Sheets-Sheet 2

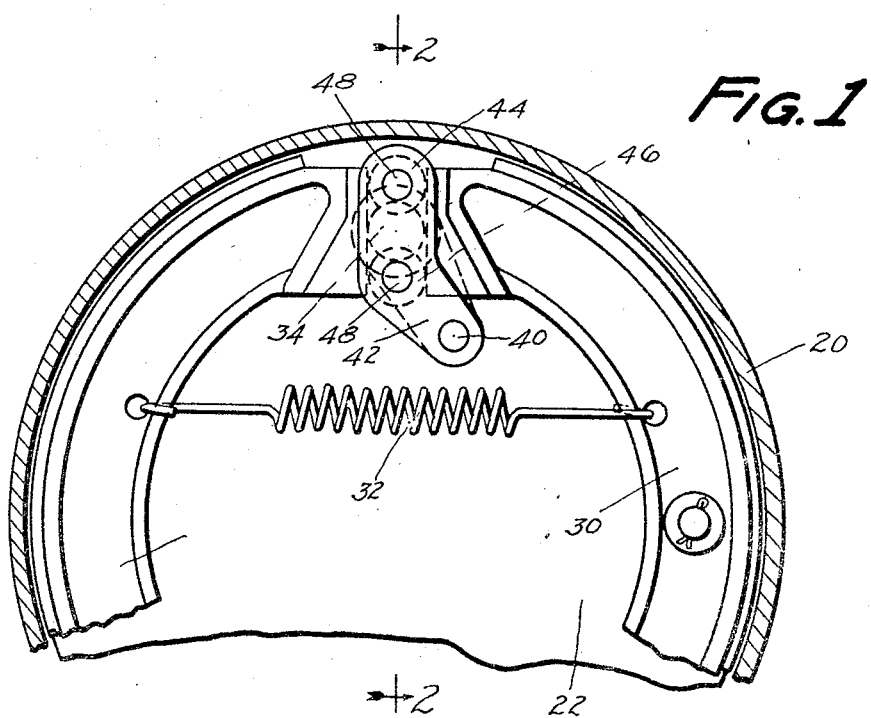
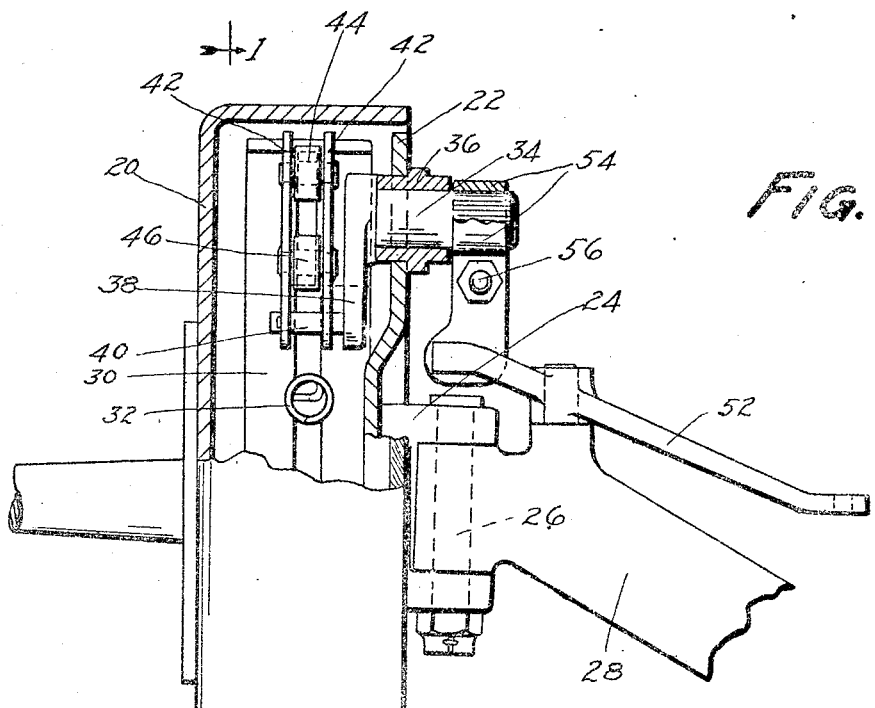

INVENTOR
GEORGE K. McCANN
BY
M. W. McConkey
ATTORNEY

Patented Aug. 30, 1932

1,875,079

UNITED STATES PATENT OFFICE

GEORGE K. McCANN, OF SOUTH BEND, INDIANA, ASSIGNOR TO BENDIX BRAKE COMPANY, OF SOUTH BEND, INDIANA, A CORPORATION OF ILLINOIS

BRAKE

Application filed February 16, 1928. Serial No. 254,651.

This invention relates to brakes and the like, and is illustrated as embodied in novel shaft-operating means for applying a front wheel brake. An object of the invention is to provide simple and efficient mechanism which can be manufactured economically.

One feature of the invention relates to an improved shaft-operating arm, preferably formed from sheet steel, which has a portion looped about the shaft and extended to form a double-thickness operating arm. The looped portion is clamped upon the shaft by contracting it with a bolt, or other clamping means, engaging spaced parallel portions at one side of the shaft. I prefer to arrange for ready adjustment by threading or otherwise mounting a novel thrust member transversely of the end of the above-described double-thickness portion of the arm.

Another feature of the invention relates to novel floating lever or levers operated by a crank arm on the shaft, and having rollers or the like thrust parts engaging the shoes. Preferably the rollers are carried by two clamped levers which embrace the ends of the shoes to hold them laterally.

The above and other objects and features of the invention, including various novel combinations of parts and desirable details of construction, will be apparent from the following description of the illustrative embodiments shown in the accompanying drawings, in which:

Figure 1 is a partial vertical section through the brake, just inside the head of the brake drum, and showing the brake shoes in side elevation;

Figure 2 is a partial vertical section on the line 2—2 of Figure 1, showing the operating mechanism of the brake;

Figure 5:
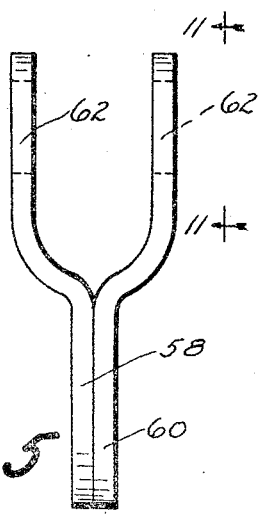
Figure 5 is an elevation of a modified arm, corresponding to Figure 4, but showing the arm only partly finished.

The illustrated brake includes a drum 20 rotating with a wheel (not shown), and a stationary support such as a backing plate 22 mounted on the wheel knuckle 24 at the open side of the drum. The knuckle may be swiveled by a king-pin 26 or the like at the end of the usual axle 28. Within the drum 20 is arranged the friction means of the brake, illustrated as including shoes 30 urged away from the drum by the usual return spring 32.

The brake applying means preferably includes a shaft 34 journaled in a bracket 36 secured to the backing plate 22, and having at its end a crank arm 38 extending radially inward of the brake, and having a pivot 40 at its end.

Figure 10:
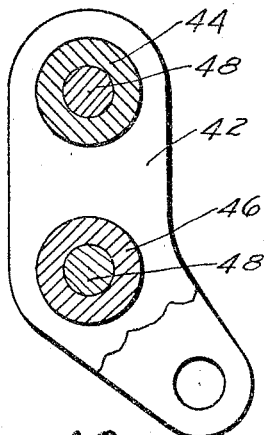
Figure 10 is a section through the floating lever on the line 10—10 of Figure 9.
Figure 9:
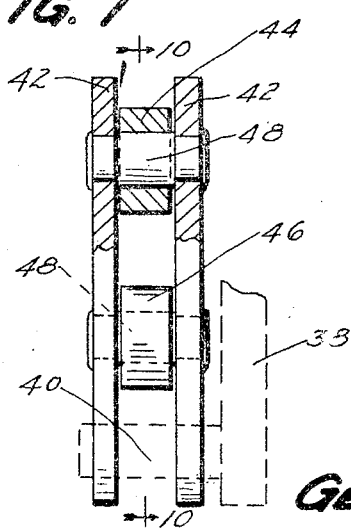
Figure 9 is a vertical section through the floating brake-applying lever.

The shoes 30 are forced apart against the drum by a floating lever or levers mounted on the pivot 40, and illustrated as including two flat stampings or levers 42 which have thrust parts such as shoe-engaging rollers 44 and 46 mounted between them. As best shown in Figures 9 and 10, these rollers may be journaled on pivot pins 48 which are shouldered to space the levers 42 apart, so they will not bind on the rollers, and which are riveted over on the levers 42 at their ends to form a permanent sub-assembly. As shown in Figure 1, the ends of shoes 30 may extend between levers 42 in engaging the rollers, so that the levers hold the shoe ends laterally.

Shaft 34 is shown operated by a novel stamped operating arm engaged by the rounded end of a lever 52 fulcrumed on axle 28, the center of curvature of said end being in or immediately adjacent the axis of kingpin 26 when the brake is applied.

Figure 4:
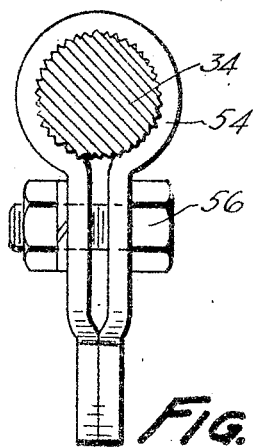
Figure 4 is an elevation of the arm, looking from the left in Figure 3.
Figure 3:
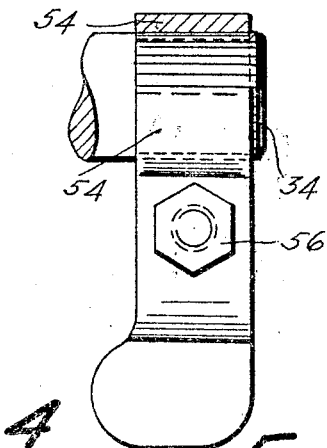
Figure 3 is an enlarged rear elevation of the novel stamped shaft-operating arm.

The stamped arm shown in Figures 2-4 includes a looped portion 54 embracing the serrated end of shaft 34, and extended as a double-thickness portion engaged by lever 52. At least adjacent shaft 34, the two thicknesses, while approximately parallel, are spaced apart far enough for engagement with a clamp bolt or the like 56 which can be tightened to contract portion 54 on the shaft.

Figure 6:
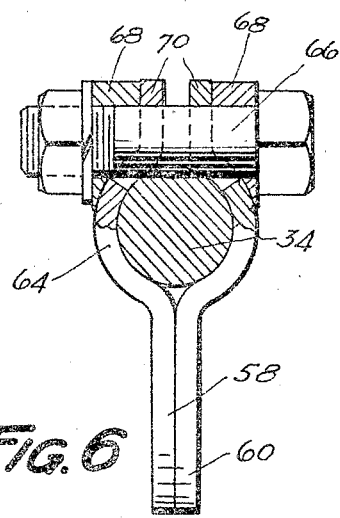
Figure 6 is a similar view showing the modified arm finished and mounted on the shaft.
Figure 11:
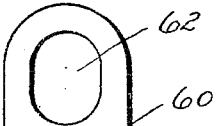
Figure 11 is a detail view of part of the partly-formed lever of Figure 5, looking in the direction of the arrows 11—11 in Figure 5.

In the arrangement of Figures 5 and 6, the arm is formed by welding or otherwise fastening together two separately-formed stampings 58 and 60 forming a double-thickness arm engaged by lever 52. The upper ends of these stampings are spread apart and formed with elliptical openings 62 (Figures 5 and 11), and are then formed toward each other (Figure 6) to form a looped portion 64 embracing shaft 34. Shaft 34 is formed with a transverse groove or keyway for a clamping bolt 66 passing through fittings 68 engaging the parallel spaced ends 70 of the two stampings.

Figure 7:
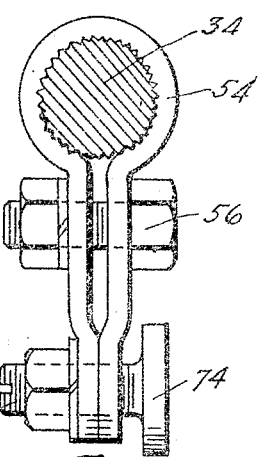
Figure 7 is a view of the arm of Figure 4, but provided with an adjusting device threaded transversely of its end.
Figure 8:
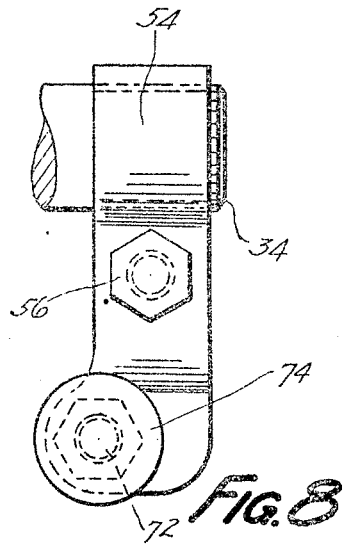
Figure 8 is an elevation corresponding to Figure 3, but showing the arm of Figure 7.

The arrangement of Figures 7 and 8 is the same as that of Figures 3 and 4, except that a thrust part 72, formed with an enlarged head 74 for engagement with lever 52, is threaded or otherwise mounted in the end of the double-thickness portion of the novel stamped operating arm.

While several illustrative embodiments have been described in detail, it is not my intention to limit the scope of the invention to those particular embodiments, or otherwise than by the terms of the appended claims.

I claim:

1. Operating means for a shaft comprising, in combination, a sheet-metal arm including a portion looped about the shaft and extended to form a double-thickness portion integral with the looped portion having parallel spaced portions and engaging portions, and a clamping member engaging the spaced parallel portions and arranged to draw them together to contract the looped portion about the shaft.

2. Operating means for a shaft comprising, in combination, a sheet-metal arm including a portion looped about the shaft and extended to form a double-thickness portion integral with the looped portion, the two thicknesses being arranged in spaced parallel relation with their ends engaging one another, and a clamping member engaging the spaced parallel thicknesses and arranged to draw them together to contract the looped portion about the shaft.

3. Operating means for a shaft comprising, in combination, a sheet-metal arm including a portion looped about the shaft and extended to form a double-thickness portion integral with the looped portion and having at one side of the shaft parallel portions spaced a short distance apart and flapped end portions, and a clamping member engaging the spaced parallel portions and arranged to draw them together to contract the looped portion about the shaft, together with a thrust member extending transversely of said double-thickness portion at the end opposite the shaft.

4. Operating means for a shaft comprising, in combination, a sheet-metal arm including a portion looped about the shaft and extended to form a double-thickness portion integral with the looped portion, the two thicknesses being parallel and spaced a short distance apart adjacent the shaft and having flat surfaces on their ends engaging one another, and a clamping member engaging the spaced parallel thicknesses and arranged to draw them together to contract the looped portion about the shaft, together with thrust member extending transversely of said double-thickness portion at the end opposite the shaft.

5. Operating means for a shaft comprising in combination, a sheet-metal arm including a portion looped about the shaft and extended to form a double-thickness portion integral with the looped portion and having at one side of the shaft parallel portions spaced short distance apart, and a clamping member engaging the spaced parallel portions and arranged to draw them together to contract the looped portion about the shaft, together with a thrust member threaded transversely through said double-thickness portion at the end opposite the shaft.

6. Operating means for a shaft comprising in combination, a sheet-metal arm including portion looped about the shaft and extended to form a double-thickness portion integral with the looped portion, the two thicknesses being parallel and spaced a short distance apart at least adjacent the shaft, and a clamping member engaging the spaced parallel thicknesses and arranged to draw them together to contract the looped portion about the shaft, together with a thrust member threaded transversely through said double thickness portion at the end opposite the shaft.

In testimony whereof, I have hereunto signed my name.

GEORGE K. McCANN.